US012734595B2

(12) United States Patent
Lee et al.

(10) Patent No.: US 12,734,595 B2
(45) Date of Patent: Sep. 15, 2026

(54) INLINE WELD-BEAD CUTTING APPARATUS FOR SPIRAL PIPE

(71) Applicant: State Pipe & Supply, Inc., Rialto, CA (US)

(72) Inventors: Jun Lee, Irvine, CA (US); Woong Park, Chino Hills, CA (US)

(73) Assignee: State Pipe & Supply, Inc., Rialto, CA (US)

(*) Notice: Subject to any disclaimer, the term of this patent is extended or adjusted under 35 U.S.C. 154(b) by 365 days.

(21) Appl. No.: 18/536,440

(22) Filed: Dec. 12, 2023

(65) Prior Publication Data

US 2024/0238882 A1 Jul. 18, 2024

(30) Foreign Application Priority Data

Jan. 13, 2023 (KR) ........................ 10-2023-0005388

(51) Int. Cl.
*B23C 3/12* (2006.01)
*B23Q 1/62* (2006.01)

(52) U.S. Cl.
CPC .......... *B23C 3/122* (2013.01); *B23C 2255/08* (2013.01); *B23Q 1/626* (2013.01)

(58) Field of Classification Search
CPC ........... B23C 1/06; B23C 1/626; B23C 3/122; B23C 2255/08; Y10T 409/304144;
(Continued)

(56) References Cited

U.S. PATENT DOCUMENTS 3,895,559 A * 7/1975 Hoffman ................... B23C 1/06 409/188
4,100,809 A * 7/1978 Bobrov .............. G01N 29/2412 73/609

(Continued)

FOREIGN PATENT DOCUMENTS

CN 217890470 U * 11/2022
DE 102008037205 B3 * 12/2009 ............... B24B 5/08

(Continued)

OTHER PUBLICATIONS

Machine Translation of KR101536641B1—Baek Seung Tae; "Apparatus For Cutting Off Bead On Welded Steel Pipe"; Jul. 14, 2015.*

*Primary Examiner* — Sunil K Singh
*Assistant Examiner* — Michael Vitale
(74) *Attorney, Agent, or Firm* — Revolution IP, PLLC

(57) ABSTRACT

An inline weld-bead cutting apparatus for a spiral pipe for cutting a weld-bead protruding from a butt-jointed portion of the present invention includes: a main frame; an up down movement plate; a mina up down driving part; a forward-backward movement plate; a forward-backward driving part; and a cutting part provided in the forward-backward movement plate, and cutting a weld-bead protruding on an outer surface of a pipe transferred from the pipe transfer line, and the cutting part includes a mounting plate provided in the forward-backward movement plate to be movable up and down, a rotation motor provided in the mounting plate, a spindle provided in the mounting plate to be rotatable through a bearing, and receiving a rotational force of the rotation motor and having an up down-direction shaft, and a cutting tool mounted on a terminal of the spindle, and including an insert for cutting the weld-bead.

3 Claims, 5 Drawing Sheets

(58) Field of Classification Search
CPC ... Y10T 409/30784; Y10T 409/307952; Y10T 309/576; Y10T 309/632; Y10T 309/688; B23Q 1/626
USPC ................ 409/138, 204, 206, 235, 236, 237
See application file for complete search history.

(56) References Cited

U.S. PATENT DOCUMENTS

| | | | | |
|---|---|---|---|---|
| 4,149,822 | A * | 4/1979 | Lehmkuhl | B23Q 11/001 408/235 |
| 4,349,182 | A * | 9/1982 | Blackburn | B23K 7/005 266/61 |
| 6,843,624 | B2 * | 1/2005 | Sugata | B23Q 1/626 409/141 |
| 7,240,411 | B2 * | 7/2007 | Matsumoto | B23Q 1/70 82/149 |
| 7,811,034 | B1 * | 10/2010 | Karow | B23D 21/006 82/131 |
| 7,972,097 | B2 * | 7/2011 | Elrod | B23Q 17/10 409/187 |
| 9,545,677 | B2 * | 1/2017 | Pasquetto | B23Q 11/0025 |
| 2005/0022353 | A1 * | 2/2005 | Viola | B23C 3/122 29/412 |
| 2012/0213606 | A1 * | 8/2012 | Tullmann | B23Q 11/0067 409/137 |
| 2018/0207732 | A1 * | 7/2018 | Kosugi | B23B 39/168 |

FOREIGN PATENT DOCUMENTS

| | | | | |
|---|---|---|---|---|
| DE | 102009058649 | A1 * | 6/2011 | B23Q 1/628 |
| DE | 102011110289 | B3 * | 7/2012 | B23Q 1/017 |
| DE | 102013207125 | A1 * | 10/2014 | B23Q 11/0028 |
| JP | 59161210 | A * | 9/1984 | B23C 3/122 |
| KR | 20080000476 | U * | 4/2008 | B23C 3/122 |
| KR | 10-1536641 | B1 | 7/2015 | |

* cited by examiner

INLINE WELD-BEAD CUTTING APPARATUS FOR SPIRAL PIPE

TECHNICAL FIELD

The present invention relates to an inline weld-bead cutting apparatus for a spiral pipe, which is used for a spiral pipe butt-jointed by a spiral method, for cutting a weld-bead protruding from the butt-jointed portion immediately after welding.

BACKGROUND ART

Generally, methods for manufacturing large-diameter steel pipes for water and sewage pipes, bridge piles, etc. are roughly divided into a roll bending method and a spiral method. In either case, the shape of the steel pipe is obtained by automatically joining with butt joints or overlap joints while maintaining a roundness using a shaping device.

Depending on a welding method, the steel pipe is classified into an electric resistance welded steel pipe (ERW steel pipe), a gas welding steel pipe, and an arc welding steel pipe (SAW steel pipe). Afterwards, the steel pipe is first coated with an adhesive with excellent anti-corrosion properties, and then coated with a resin material suitable for installation purposes, such as polyethylene or polyurethane, to complete the steel pipe. In this case, in the case of butt joining, since the weld-bead protrudes on an outer peripheral surface of the steel pipe, which causes coating defects due to uneven surfaces during coating work, and to conceal this, the thickness of the coating film becomes unnecessarily thick, thereby increasing material costs and man-hours.

To solve this problem, workers cut or grind the protruding beads with tools, but the effect of reducing man-hours and improving coating quality is minimal.

A bead cutting apparatus for welding steel pipe disclosed in Korean Patent Unexamined Publication No. 1536641 as a prior art related to automation of bead cutting, as shown in the drawing of the registered patent publication, includes a body 20 having a transfer roller 25 on a base frame 21 to move a steel pipe 10 toward a cutting frame 22, a lifting means 30 having a lifting platform 31 to be movable up and down on the cutting frame 22, a cutting means 40 supporting a cutter 45 with a tool platform 41 interposed in the lifting means 30 and cutting a protruding weld-bead 15 with a cutter 45, a guiding means 50 supporting a guide roller 55 at allocation adjacent to the cutter 45 and restraining fluctuation of the weld-bead 15 with the guide roller 55, and a control means 60 including a controller 62 to control motions of the steel pipe 10 and the cutter 45 by a set algorithm. In particular, the tool platform 41 of the cutting means 40 is installed on the lifting means 30 via a lateral motor 37 to enable axial movement of the cutter 45.

However, the conventional welding steel pipe bead cutting apparatus has the following problems.

First, since a technical configuration is provided in which the cutting means 40 is provided in the form of a cantilever on the lifting means 30, and the cutter 45 is mounted at the end thereof, while the weld-bead 15 is cut while the cutter 45 is rotated around a shaft 43 as an axis by the cutting motor 46 and moved downward through the lifting means 30, there is a problem in that a perpendicular load is applied to the shaft 43 of the cutting means 40 by a reaction force and a bending moment is generated in the shaft 43, and as a result, accuracy of cutting processing deteriorates while the shaft 43 is bent.

Second, since a technical configuration is provided in which a bead detection sensor 65 detects the location of the bead, the location of the cutter 45 can be adjusted to suit the weld-bead 15 by a method such as rotating the steel pipe 10 by detecting the location of the weld-bead 15, but the surface of the steel pipe 10 is jointly cut while over-cutting is made by the cutter because a protruding degree of the weld-bead cannot be detected, so there is a problem in that the defect of the steel pipe is caused or under-cutting is made. In particular, when an out of roundness of the steel pipe 10 is changed, there is a problem in that more defects occur. Further, there is a problem in that a cutter method that can be applied only to a straight-type welding steel pipe 10 and an insert tip of a shape similar to a curvature for each outer diameter of the steel pipe must be prepared.

Third, since a technical configuration is provided in which the base frame 21 with the transfer roller 25 to form one main body 20, there is a problem in that it is impossible to move and install the welding steel pipe bead cutting apparatus in a production line in which the steel pipe 10 is welded and output while being butt-jointed by the spiral method. That is, there is a problem in that it is impossible to move and install the welding steel pipe bead cutting apparatus in the production line because there is the base frame already provided in the production line and because a separate movement means is not provided, and as a result, a place for cutting the weld-bead and a separate process line having a facility are required, so there is a problem in that a production price increases. Further, since the steel pipe 10 should be maintained at an accurate location at a constant speed, and processed during a processing operation, there is a problem in that only when a separate facility operation worker should adjust the welding steel pipe bead cutting apparatus, the welding steel pipe bead cutting apparatus can be actuated.

Fourth, there is a problem in that when the welding steel pipe bead cutting apparatus breaks down, it is difficult for the worker to repair the welding steel pipe bead cutting apparatus.

DISCLOSURE

Technical Problem

A technical object of the present invention is to provide an inline weld-bead cutting apparatus for a spiral pipe, which can prevent a shaft of a cutting tool while the cutting tool cuts a weld-bead protruding on an outer surface while moving down on an inline after welding a spiral welding pipe is completed, and process pipes of all specifications with one single processing tool constituted by the cutting tool and an insert (tip).

Another technical object of the present invention is to provide an inline weld-bead cutting apparatus for a spiral pipe, which can cut only a protruding portion of the weld-bead by accurately and rapidly targeting the weld-bead even though the out of roundness is changed, and avoid a failure when an abnormal shape of the weld-bead protruding on an outer surface of the pipe, a problem of the out of roundness, and an abnormal signal of a cutting processing equipment are detected.

Yet another technical object of the present invention is to provide an inline weld-bead cutting apparatus for a spiral pipe, which can be moved and installed in a production line.

Still yet another technical object of the present invention is to provide an inline weld-bead cutting apparatus for a spiral pipe, which is easily repaired by a worker.

Technical Solution

In order to achieve the objects, an inline weld-bead cutting apparatus for a spiral pipe for cutting a weld-bead protruding from a butt-jointed portion of the present invention according to an embodiment of the present invention includes: a main frame placed through which a pipe transfer line passes: an up down movement plate provide in the main frame to be movable up and down: a main up down driving part driving the up down movement plate up and down: a forward-backward movement plate provided in the up down movement plate to be movable forward and backward; a forward-backward driving part driving the forward-backward movement plate forward and backward; and a cutting part provided in the forward-backward movement plate, and cutting a weld-bead protruding on an outer surface of a pipe transferred from the pipe transfer line, and the cutting part includes a mounting plate provided in the forward-backward movement plate to be movable up and down, a rotation motor provided in the mounting plate, a spindle provided in the mounting plate to be rotatable through a bearing, and receiving a rotational force of the rotation motor and having an up down-direction shaft, and a cutting tool mounted on a terminal of the spindle, and including an insert for cutting the weld-bead.

The cutting part may further include a roundness interlocking part moving the cutting tool up and down by interlocking with a change in out of roundness of the pipe.

The roundness interlocking part may include a cutting side up down driving part moving the mounting plate up and down, a touch sensor provided on the bearing, and sensing a height of an outer surface in contact with the outer surface of the pipe, and a roundness interlocking control part controlling the cutting side up down driving part so that the cutting tool is placed at the height of the out surface of the pipe by receiving a value of the touch sensor.

A lowermost pipe contact surface of the touch sensor may be positioned at the same height as a lowermost pipe contact surface of the insert.

The touch sensor may be provided in the bearing through a sensor mounting part, and the sensor mounting part may further include a fixation bracket fixed to the bearing and a sensor zero point adjustment part provided between the fixation bracket and the touch sensor, and moving the touch sensor up and down.

The cutting part may further include a cutting impact prevention part preventing a cutting impact of the cutting tool applied to the spindle from being directly transmitted to the rotation motor.

The cutting impact prevention part may include a first pulley provided on a shaft of the rotation motor, a second pulley provided at a tip of the spindle, and a belt connecting the first pulley and the second pulley.

The main frame may include a left main frame and a right main frame to be disposed with the pipe transfer line interposed therebetween, and a ceiling frame connecting upper ends of the left main frame and the right main frame.

The inline weld-bead cutting apparatus 100 for a spiral pipe according to the embodiment of the present invention may further include respective transfer connection rings provided at four corners on an upper surface of the ceiling frame, respectively.

The inline weld-bead cutting apparatus 100 for a spiral pipe according to the embodiment of the present invention may further include a repair foot support part provided in at least one of the left main frame and the right main frame in an up down direction, and used for a worker to go up and down by stepping on the repair foot support part.

Advantageous Effects

As described above, the inline weld-bead cutting apparatus for a spiral pipe according to the embodiment of the present invention can have the following effects.

According to the embodiment of the present invention, since a technical configuration is provided in which an inline weld-bead cutting apparatus for a spiral pipe for cutting a weld-bead protruding from a butt-jointed portion of the present invention includes: a main frame: an up down movement plate: a mina up down driving part: a forward-backward movement plate: a forward-backward driving part: and a cutting part, and the cutting part includes a mounting plate, a rotation motor, a spindle, a cutting tool, and a cutting side up down driving part, and the spindle has an up down-direction shaft, and the cutting tool is mounted on a terminal of the spindle, and the weld-bead is cut through an insert, the cutting part is provided in an up-down direction unlike the prior art in which the cutting part is provided in the form of a cantilever, so a bending moment is not generated to prevent the shaft of the cutting tool from being bent while the cutting tool cuts the weld-bead while moving down. Further, since the cutting means of the bead cutting apparatus in the prior art is a scheme in which the cutter (insert) cuts the weld-bead while rotating perpendicularly with respect to a welding surface, a cutter (insert) having a similar curvature is required for each size of an outer diameter of the steel pipe, but since the cutting part of the present invention is a scheme in which the cutting part rotates horizontally with respect to the welding surface, it may be easy to adjust a cutting location of the pipe regardless of the size of the outer diameter without replacing the cutting tool and the insert, so pipes of all specifications may be processed by one cutting tool and one insert (tip).

Further, according to the embodiment of the present invention, since a technical configuration further including a roundness interlocking part is provided, even though the roundness of a partial section of the pipe deviates, an up-down height of the cutting part can be corrected through the roundness interlocking part according to a change in out of roundness, so the cutting part can be prevented from being in contact with the outer surface of the pipe while the cutting part cuts the weld-bead protruding on the outer surface, and ultimately, over-cutting or under-cutting by the insert of the cutting part is not made, thereby preventing the resulting defect of the pipe. Further, when an abnormal shape of the weld-bead protruding on the outer surface of the pipe, an out of roundness problem of the pipe 1, and an abnormal signal of the cutting part are detected, the cutting part is moved up and down through the cutting side up down driving part of the roundness interlocking part to avoid the failure.

Further, according to the embodiment of the present invention, since a technical configuration further including a cutting impact prevention part is provided, a cutting impact of the cutting tool applied to the spindle is prevented from being directly transmitted to the rotation motor to prevent the lifespan of the rotation motor from being shortened due to an impact load.

Further, according to the embodiment of the present invention, since a technical configuration is provided in which the inline weld-bead cutting apparatus for spiral pipe of the present invention further includes four transfer connection rings, the inline weld-bead cutting apparatus for a spiral pipe according to the present invention may be moved while a hook of a crane is latched and lifted by four transfer connection rings, so the inline weld-bead cutting apparatus, as per the present invention, can be relocated to a production facility where pipes are welded and output through spiral butt-jointing. It is placed in-line on the pipe transfer line within the production facility, eliminating the need for a separate facility with dedicated equipment for weld-bead cutting. This integration ultimately results in a substantial reduction in production costs compared to conventional methods.

Further, according to the embodiment of the present invention, since a technical configuration further including a repair foot support part is provided, when the inline weld-bead cutting apparatus for a spiral pipe of the present invention breaks down, the worker can directly repair the inline weld-bead cutting apparatus for a spiral pipe by using the repair foot support part up to a relevant height, so it may be possible to immediately repair the inline weld-bead cutting apparatus for a spiral pipe at low cost without the need for a call of a high place working vehicle. Further, when an abnormal power load is detected, the cutting part is moved up through the cutting side up down driving part to avoid a risk of failure occurrence, and immediate repairing may be possible by using the repair foot support part even a failure occurs.

MODE FOR INVENTION

Hereinafter, an embodiment of the present invention will be described more fully hereinafter with reference to the accompanying drawings so as to be easily implemented by those skilled in the art. However, the present invention may be modified in various different ways, all without departing from the spirit or scope of the present invention.

Figure 1:
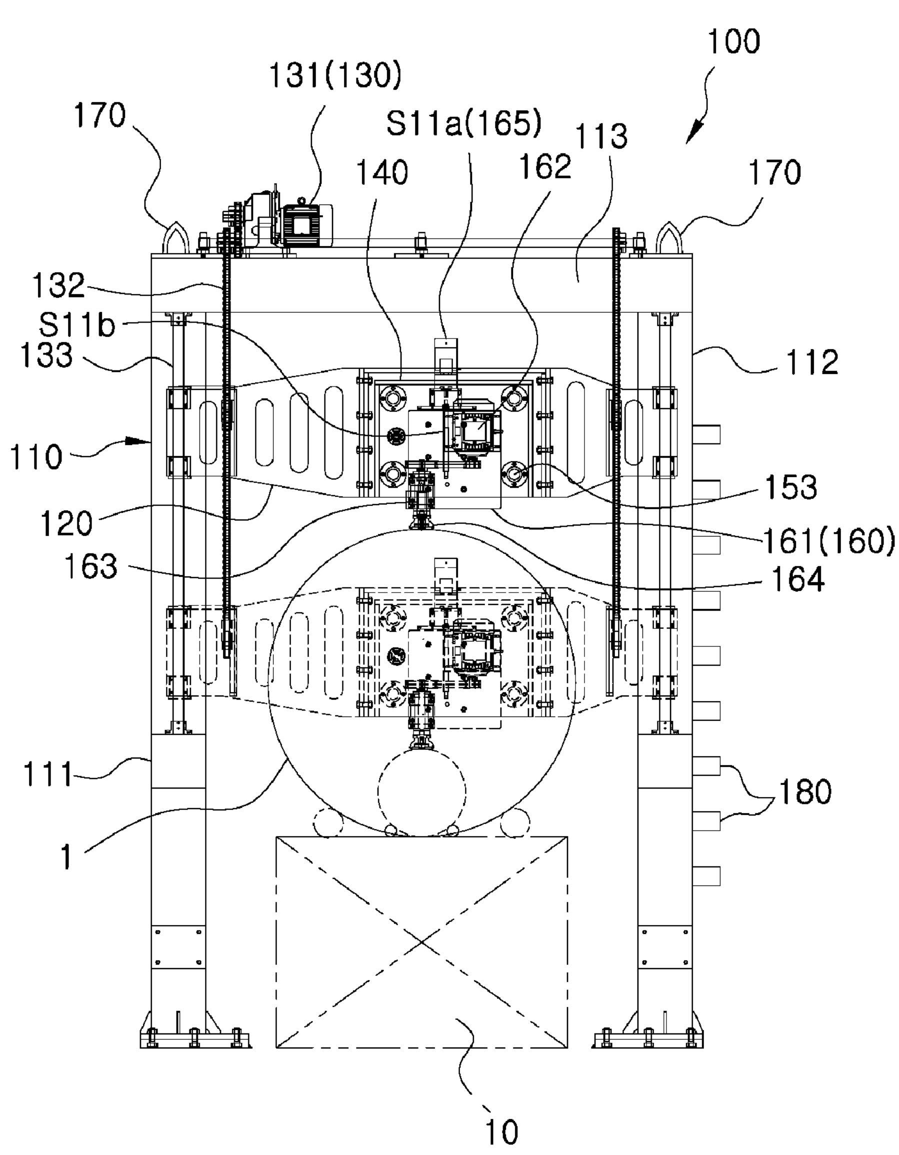
FIG. 1 is a schematic front view of an inline weld-bead cutting apparatus for a spiral pipe viewed in a direction in which a pipe is transferred according to an embodiment of the present invention.
Figure 2:
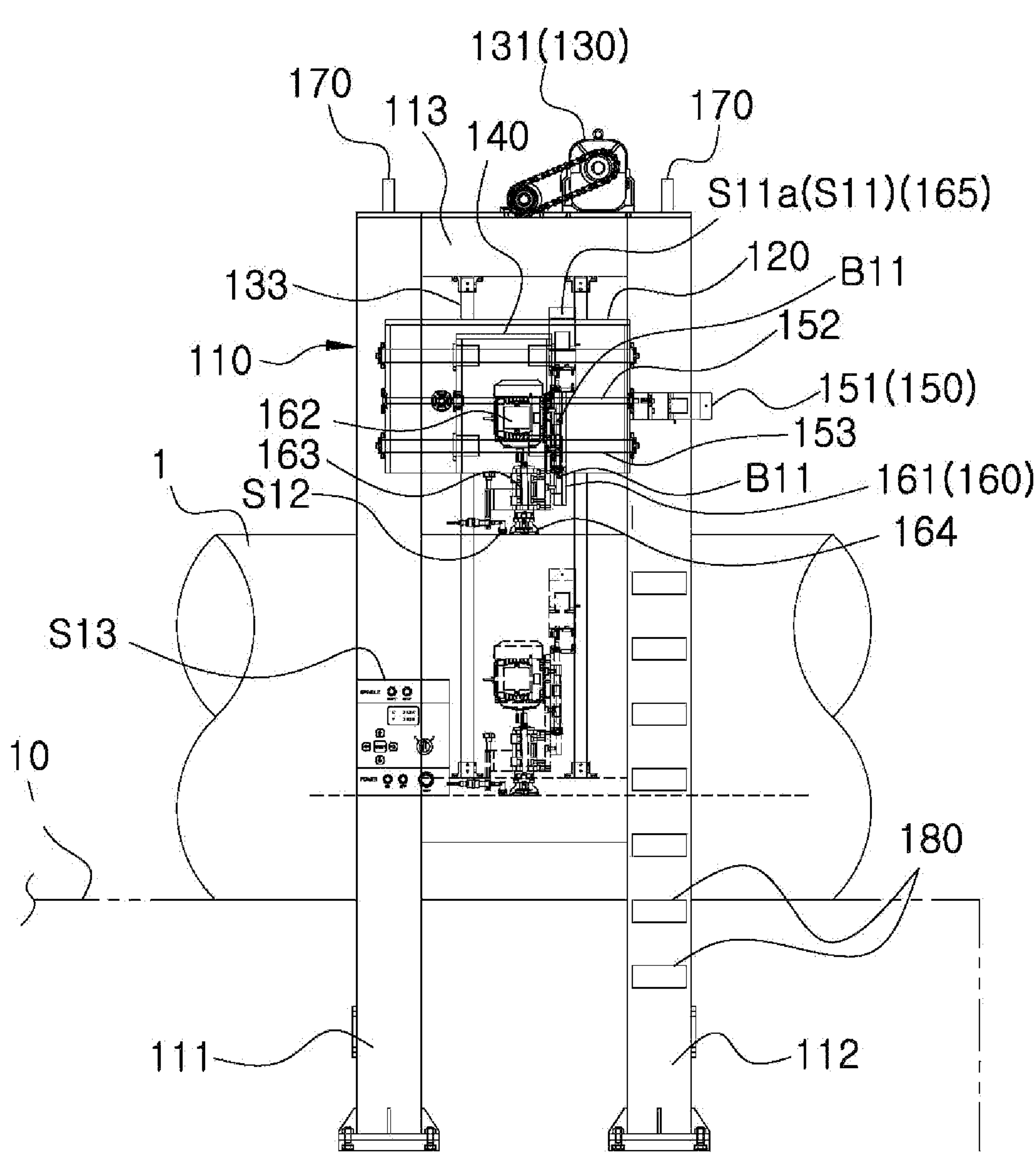
FIG. 2 is a left side view of the inline weld-bead cutting apparatus for a spiral pipe of FIG. 1 viewed from the left.
Figure 3:
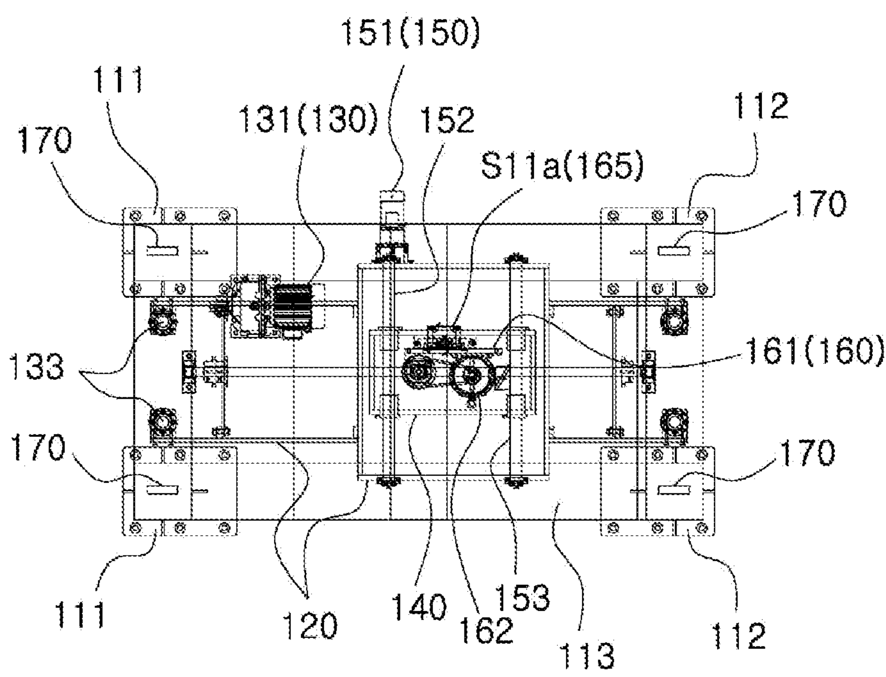
FIG. 3 is a plan view of the inline weld-bead cutting apparatus for a spiral pipe of FIG. 1 viewed from the top.
Figure 4:
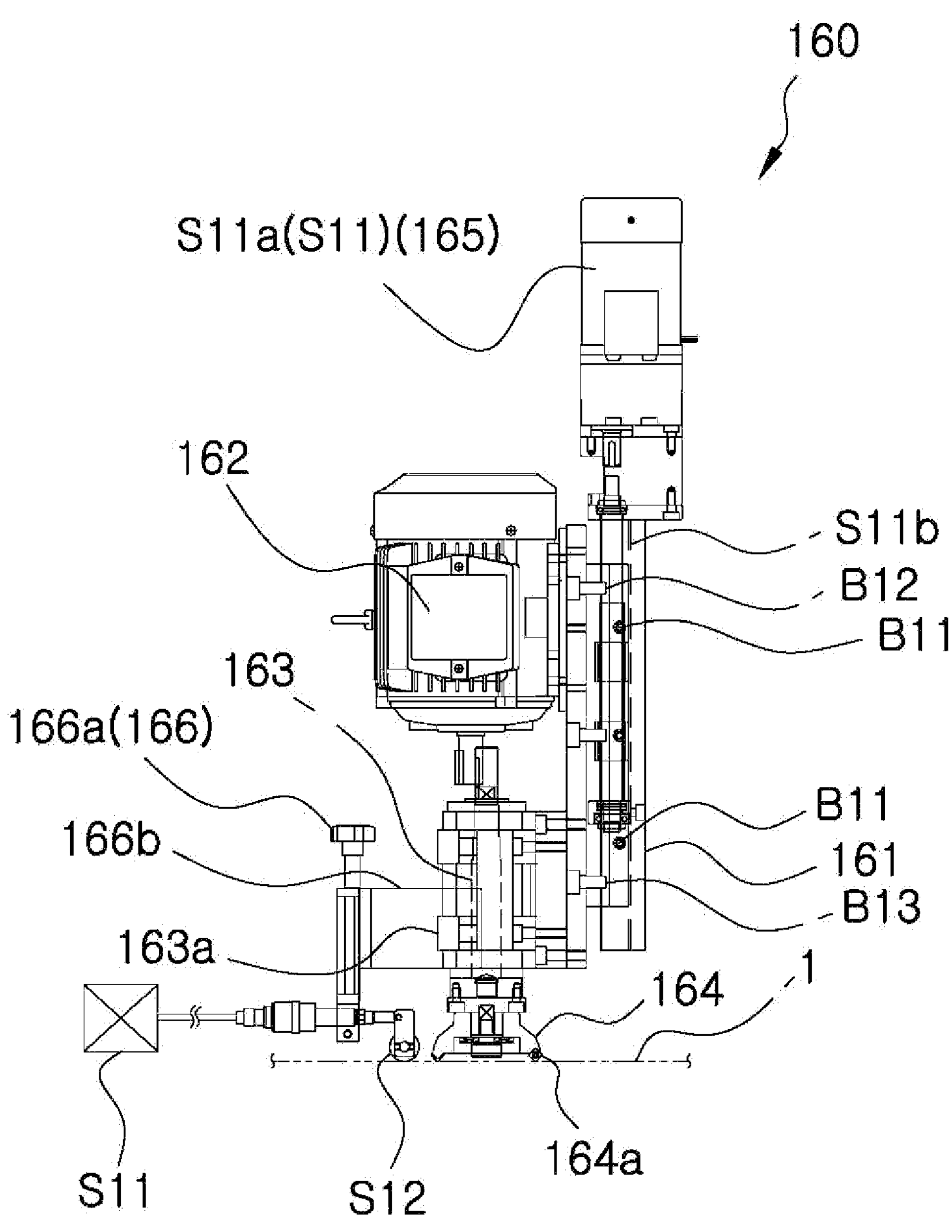
FIG. 4 is an enlarged diagram illustrating a cutting main in the inline weld-bead cutting apparatus for a spiral pipe of FIG. 2.
Figure 5:
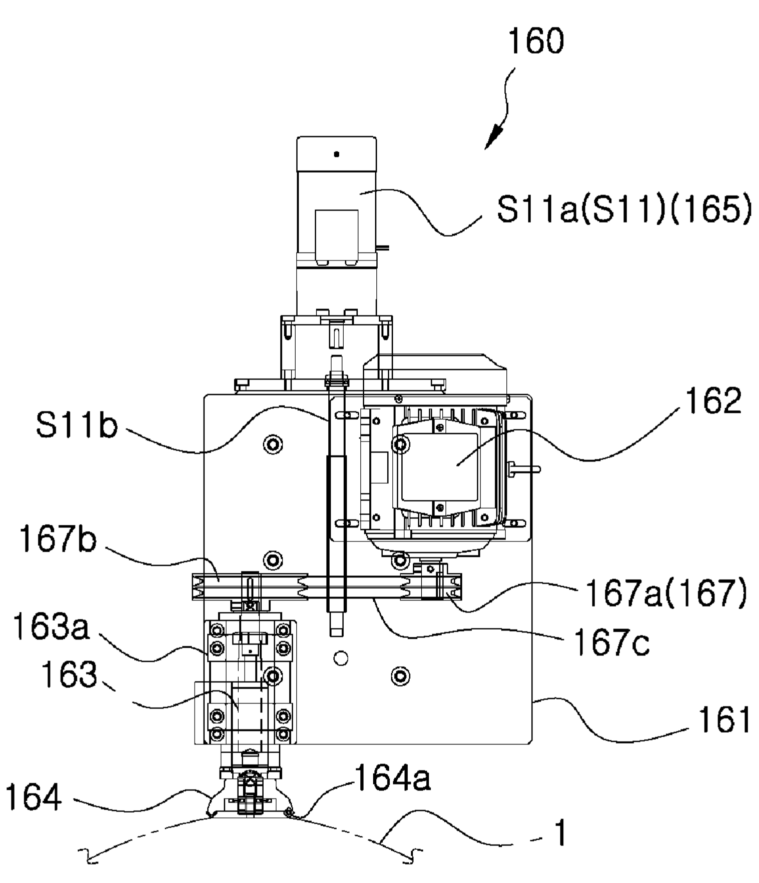
FIG. 5 is an enlarged diagram illustrating the cutting main in the inline weld-bead cutting apparatus for a spiral pipe of FIG. 1.

FIG. 1 is a schematic front view of an inline weld-bead cutting apparatus for a spiral pipe viewed in a direction in which a pipe is transferred according to an embodiment of the present invention, FIG. 2 is a left side view of the inline weld-bead cutting apparatus for a spiral pipe of FIG. 1 viewed from the left, and FIG. 3 is a plan view of the inline weld-bead cutting apparatus for a spiral pipe of FIG. 1 viewed from the top. FIG. 4 is an enlarged diagram illustrating a cutting main in the inline weld-bead cutting apparatus for a spiral pipe of FIG. 2 and FIG. 5 is an enlarged diagram illustrating the cutting main in the inline weld-bead cutting apparatus for a spiral pipe of FIG. 1.

The inline weld-bead cutting apparatus 100 for a spiral pipe according to an embodiment of the present invention as an inline weld-bead cutting apparatus for a spiral pipe for removing a weld-bead protruding from a portion of a butt-jointed pipe 1 includes a main frame 110, an up-down movement plate 120, a main up down driving part 130, a forward and backward movement plate 140, a forward and backward driving part 150, and a cutting part 160. Hereinafter, continuously referring to FIGS. 1 to 5, each component will be described in detail.

The main frame 110 is a component that forms a main frame of the inline weld-bead cutting apparatus 100 for a spiral pipe of the present invention. As illustrated in FIG. 1, this main frame 110 may be placed so that a pipe transfer line 10 passes through a center thereof.

For example, the main frame 110 may include two left main frames 111, two right main frames 112, and a ceiling frame 113, as illustrated in FIGS. 1 to 3. As illustrated in FIG. 1, the left main frame 111 and the right main frame 112 may be disposed with the pipe transfer line 10 interposed therebetween. The ceiling frame 113 may connect upper ends of two left main frames 111 and two right main frames 112, and may be provided with a main up-down driving motor 131 of the main up down driving part 130.

The up-down movement plate 120 is a component for moving the cutting part 160 up and down together with the main up-down driving part 130. The up-down movement plate 120 may be moved up and down along the main frame 110 by the main up-down driving part 130 as illustrated in FIGS. 1 and 2. For reference, a dotted line portion shown in FIGS. 1 and 2 shows that the main up-down driving part 130 may be further moved down for a pipe having a smaller diameter.

The main up down driving part 130 is a component that applies a driving force to the up-down movement plate 120 so that the up-down movement plate 120 is moved up and down along the main frame 110. As illustrated in FIG. 1, the main up-down driving part 130 may include the main up-down driving motor 131, a chain 132, and an up-down movement guide rod 133.

The main up-down driving motor 131 may be fixed to the ceiling frame 113. The chain 132 may connect the main up down driving motor 131 and the up down movement plate 140 so that the power of the main up down driving motor 131 is transmitted to the up down movement plate 140. The up down movement guide rod 133 may be fixed to the main frame, and the up down movement plate 140 may be provided therein to be movable up and down, and may guide up down movement without fluctuation left and right or back and forth while the up down movement plate 140 moves up and down.

The forward-backward movement plate 140 is a component for moving the cutting part 160 forward and backward together with the forward and backward driving part 150. The forward-backward movement plate 140 may be moved forward and backward on the up down movement plate 120 by the forward-backward driving part 150 as illustrated in FIGS. 1 and 2. Here, the forward backward are forward and backward of a direction in which the pipe 1 is introduced along the pipe transfer line 10.

The forward-backward driving part 150 is a component that applies a driving force to the forward-backward movement plate 140 so that the forward-backward movement late 140 moves forward and backward on the up down movement plate 120. As illustrated in FIG. 2, the forward-backward driving part 150 may include a forward-backward driving motor 151, a forward-backward ball screw 152, and a forward-backward movement guide rod 153.

The forward-backward driving motor 151 may be fixed to the up down movement plate 120. When the forward-backward ball screw 152 is axially coupled to the forward-backward driving motor 131 and screw-coupled to the forward-backward movement plate 140, and a rotational force of the forward-backward driving motor 151 rotates the forward-backward ball screw 152, the forward-backward movement plate 140 screw-coupled thereto may move forward and backward in a longitudinal direction along the forward-backward ball screw 152. The forward-backward movement guide rod 153 may be fixed to the up down movement plate 120 in a forward-backward direction, and the forward-backward movement plate 140 may be provided therein to be movable forward and backward, and guide forward-backward movement without fluctuation left and right or up and down while the forward-backward movement plate 140 may move forward and backward.

The cutting part 160 is a component that is moved by the main up down driving part 130 and the forward-backward driving part 150 according to the location of the weld-bead. As illustrated in FIGS. 1 to 3, the cutting part 160 may be provided in the forward-backward movement plate 140, and may cut the weld-bead protruding on the outer surface of the pipe 1 transferred from the pipe transfer line 10.

Specifically, as illustrated in FIGS. 4 and 5, the cutting part 160 may include a mounting plate 161, a rotation motor 162, a spindle 163, and a cutting tool 164. The mounting plate 161 may be provided in the forward-backward movement plate 140 to be movable up and down, and the rotation motor 162 may be provided in the mounting plate 161. The spindle 163 may be provided in the mounting plate 161 to be rotatable through a bearing 163*a*, and may receive the rotational force of the rotation motor 162, and have an up down-direction central axis. The cutting tool 164 may be mounted on a terminal of the spindle 163, and bolt-coupled to an insert 164*a* for substantially cutting the weld-bead.

Therefore, since such components are provided, the cutting part 160 is provided in an up-down direction unlike the prior art in which the cutting part is provided in the form of a cantilever, so a bending moment is not generated to prevent the shaft of the cutting tool 164 from being bent while the cutting tool 164 cuts the weld-bead while moving down. Further, since the cutting means of the bead cutting apparatus in the prior art is a scheme in which the cutter (insert) cuts the weld-bead while rotating perpendicularly with respect to a welding surface, a cutter (insert) having a similar curvature is required for each size of an outer diameter of the steel pipe, but since the cutting part 160 of the present invention is a scheme in which the cutting part 160 rotates horizontally with respect to the welding surface as illustrated in FIG. 4, it may be easy to adjust a cutting location of the pipe 1 regardless of the size of the outer diameter without replacing the cutting tool 164 and the insert 164*a*, so pipes of all specifications may be processed by one cutting tool 164 and one insert (tip) 164*a*.

Hereinafter, continuously referring to FIGS. 4 and 5, the cutting part 160 will be described in more detail.

As illustrated in FIGS. 4 and 5, the cutting part 160 may further include a roundness interlocking part 165. The roundness interlocking part 165 may lift the cutting part 164 by interlocking with a change in out of roundness. Therefore, even though the roundness of a partial section of the pipe 1 deviates, an up-down height of the cutting part 160 may be corrected through the roundness interlocking part 165, so the cutting part 164 may be prevented from being in contact with the outer surface of the pipe 1 while the cutting part 164 cuts the weld-bead protruding on the outer surface, and ultimately, over-cutting or under-cutting by the insert 164*a* of the cutting part 164 is not made, thereby preventing the resulting defect of the pipe 1.

Specifically, as illustrated in FIGS. 4 and 5, the roundness interlocking part 165 may include a cutting side up down driving part S11, a touch sensor S12, and a roundness interlocking control part S13. The cutting side up down driving part S11 may move the mounting plate 161 up and down. The touch sensor S12 may be provided on the bearing, and may sense a height of the outer surface in contact with the outer surface of the pipe 1. The roundness interlocking control part S13 receives a value of the touch sensor S12 to control the cutting side up down driving part S11 so that the cutting tool 164 is placed at the height of the outer surface of the pipe 1. In addition, when the roundness interlocking control part S13 detects an abnormal shape of the weld-bead protruding on the outer surface of the pipe 1, an out of roundness problem of the pipe 1, and an abnormal signal of the cutting side up down driving part S11, the cutting part 160 is moved up and down through the cutting side up down driving part S11 of the roundness interlocking part 165 to avoid the failure.

For example, as illustrated in FIGS. 4 and 5, the cutting side up down driving part S11 may include a cutting side up down driving motor S11*a* and a cutting side ball screw S11*b* axially coupled thereto and screw-coupled to the mounting plate 161. Therefore, when the cutting side ball screw S11*b* is rotated by the cutting side up down driving motor S11*a*, the mounting plate 161 screw-coupled thereto and the cutting tool 164 mounted thereon may be moved up and down. In this case, the cutting side up down driving motor S11*a* may move the cutting tool 164 to interlock with the change in out of roundness while being controlled by the roundness interlocking control part S13 according to a sensing value of the touch sensor S12. For reference, the roundness interlocking control part S13 may be implemented as one or more microprocessors which operates by a set program.

Furthermore, as illustrated in FIG. 4, a lowermost pipe contact surface of the touch sensor S12 may be positioned at the same height as a lowermost pipe contact surface of the insert 164*a*. Further, as illustrated in FIG. 4, the touch sensor S12 may be provided in the bearing 163*a* through a sensor mounting part 166. For example, as illustrated in FIG. 4, the sensor mounting part 166 may include a fixation bracket 166*a* and a sensor zero point adjustment part 166*b*. The fixation bracket 166*a* may be fixed to the bearing 163*a*, and the sensor zero point adjustment part 166*b* may be provided between the fixation bracket 166*a* and the touch sensor S12, and may move the touch sensor S12 up and down.

Moreover, the cutting part 160 may further include a cutting impact prevention part 167 as illustrated in FIG. 5. The cutting impact prevention part 167 may prevent a cutting impact of the cutting tool 164 applied to the spindle 163 from being directly transmitted to the rotation motor 162. Accordingly, the cutting impact prevention part 167 prevents the cutting impact of the cutting tool 164 from being directly transmitted to the rotation motor 162 to prevent the lifespan of the rotation motor 162 from being shortened due to an impact load.

For example, as illustrated in FIG. 5, the cutting impact prevention part 167 may include a first pulley 167*a*, a second pulley 167*b*, and a belt 167*c*. The first pulley 167*a* may be provided on a shaft of the rotation motor 162, the second pulley 167*b* may be provided at a tip of the spindle 163, and the belt 167*c* may connect the first pulley 167*a* and the second pulley 167*b*. Therefore, even if the cutting impact is applied to the cutting tool 164, the impact may be absorbed through the belt 167*c* and prevented from being transmitted to the rotation motor 162.

Moreover, the inline weld-bead cutting apparatus 100 for a spiral pipe according to an embodiment of the present invention may further include a transfer connection ring 170 as illustrated in FIGS. 1 to 3. The transfer connection ring 170 may be provided at each of four corner portions on an upper surface of the ceiling frame 113.

Therefore, the inline weld-bead cutting apparatus 100 for a spiral pipe according to the present invention may be moved while a hook of a crane (not illustrated) is latched and lifted by four transfer connection rings 170, so the inline weld-bead cutting apparatus 100 for a spiral pipe according to the present invention may be moved to a production facility factory in which the pipe 1 is welded and output while being butt-jointed by the spiral method and disposed on the pipe transfer line 10 of the production facility factory an in-line form, and ultimately, a facility having a place and equipment for cutting the weld-bead is not separately required to significantly lower the production cost compared to the prior art.

Moreover, the inline weld-bead cutting apparatus 100 for a spiral pipe according to an embodiment of the present invention may further include a repair foot support part 180 as illustrated in FIGS. 1 and 2. A plurality of repair foot support parts 180 may be provided in at least one of the left main frame 111 and the right main frame 112 in the up-down direction, and may be used for the worker to go up and down by stepping on the repair foot support parts 180.

Therefore, when the inline weld-bead cutting apparatus 100 for a spiral pipe of the present invention breaks down, the worker can directly repair the inline weld-bead cutting apparatus 100 for a spiral pipe by using the repair foot support part 180 up to a relevant height, so it may be possible to immediately repair the inline weld-bead cutting apparatus 100 for a spiral pipe at low cost without the need for a call of a high place working vehicle.

While a preferred embodiment of the present invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

EXPLANATION OF REFERENCE NUMERALS AND SYMBOLS

1: Pipe
10: Pipe transfer line
100: Inline weld-bead cutting apparatus for spiral pipe
110: Main frame
120: Up down movement plate
130: Main up down driving part
131: Main up down driving motor
132: Chain
133: Up down movement guide rod
140: Forward-backward movement plate
150: Forward-backward driving part
151: Forward-backward driving motor
152: Forward-backward ball screw
153: Forward-backward movement guide rod
160: Cutting part
161: Mounting plate
162: Rotation motor
163: Spindle
163*a*: Bearing
164: Cutting tool
164*a*: Insert
165: Roundness interlocking part
S11: Cutting side up down driving part
S11*a*: Cutting side up down driving motor
S11*b*: Cutting side ball screw
S12: Touch sensor
S13: Roundness interlocking control part
166: Sensor mounting part
166*a*: Fixation bracket
166*b*: Sensor zero point adjustment part
167: Cutting impact prevention part
167*a*: First pulley
167*b*: Second pulley
167*c*: Belt
170: Transfer connection ring
180: Repair foot support part

The invention claimed is:

1. An inline weld-bead cutting apparatus for a spiral pipe for cutting a weld-bead protruding from a butt-jointed portion from the spiral pipe, comprising:
- a main frame through which a pipe transfer line passes;
- an up down movement plate provided in the main frame to be movable up and down;
- a main up down driving part driving the up down movement plate up and down;
- a forward-backward movement plate provided in the up down movement plate to be movable forward and backward;
- a forward-backward driving part driving the forward-backward movement plate forward and backward; and
- a cutting part provided in the forward-backward movement plate, and cutting the weld-bead protruding on an outer surface of the spiral pipe transferred from the pipe transfer line, wherein the cutting part includes:
- a mounting plate provided on the forward-backward movement plate to be movable up and down,
- a rotation motor provided on the mounting plate,
- a spindle provided on the mounting plate to be rotatable through a bearing, and receiving a rotational force of the rotation motor and having an up down-direction shaft,
- a cutting tool mounted on a terminal end of the spindle, the cutting tool including an insert for cutting the weld-bead, and
- a roundness interlocking part moving the cutting tool up and down by interlocking with a change in out of roundness of the spiral pipe, wherein the roundness interlocking part includes:
- a cutting side up down driving part moving the mounting plate up and down,
- a touch sensor provided on the bearing, and sensing a height of the outer surface of the spiral pipe by being in contact with the outer surface of the spiral pipe, and
- a roundness interlocking control part controlling the cutting side up down driving part so that the cutting tool is placed at the height of the outer surface of the spiral pipe by receiving a value of the touch sensor.

2. The inline weld-bead cutting apparatus for a spiral pipe of claim 1, wherein the cutting part further includes a cutting impact prevention part for preventing a cutting impact of the cutting tool applied to the spindle from being directly transmitted to the rotation motor.

3. The inline weld-bead cutting apparatus for a spiral pipe of claim 2, wherein the cutting impact prevention part includes:

a first pulley provided on a shaft of the rotation motor;

a second pulley provided on a tip of the spindle; and a belt connecting the first pulley and the second pulley.

* * * * *